(No Model.) 2 Sheets—Sheet 1.
J. T. HARRIS.
APPARATUS FOR PURIFYING LIQUIDS.
No. 531,118. Patented Dec. 18, 1894.
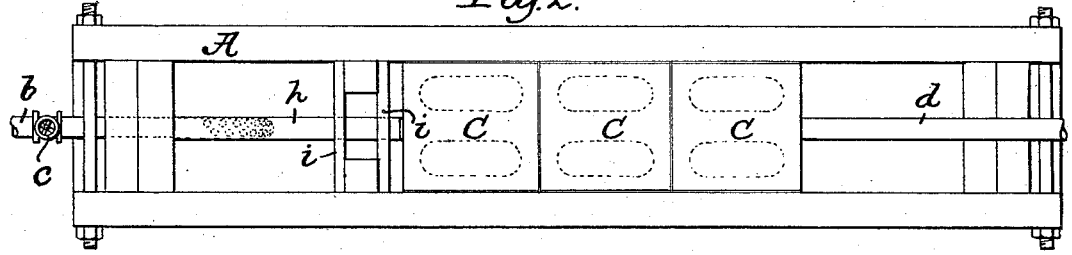
Fig. 2.
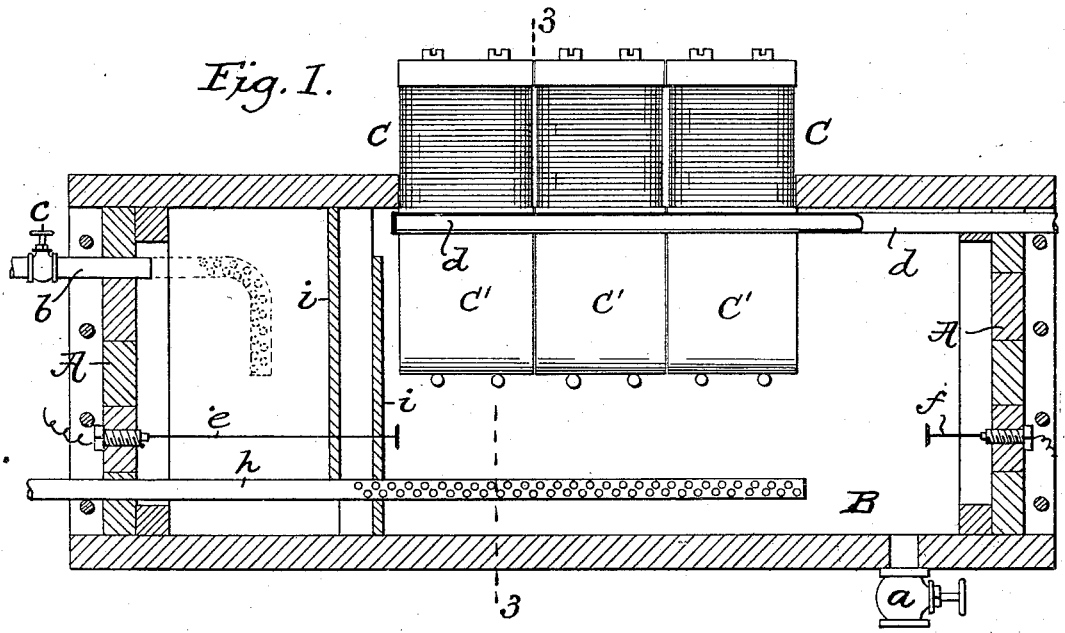
Fig. 1.
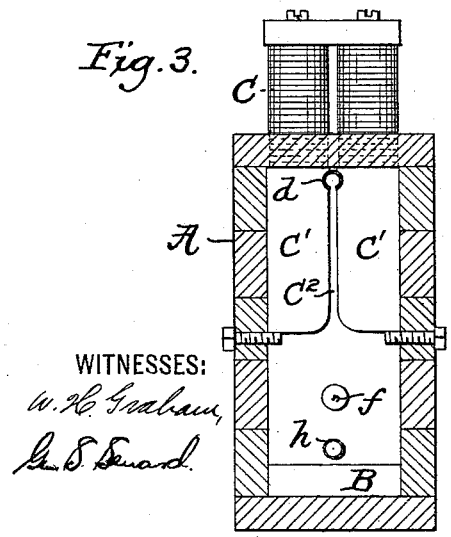
Fig. 3.
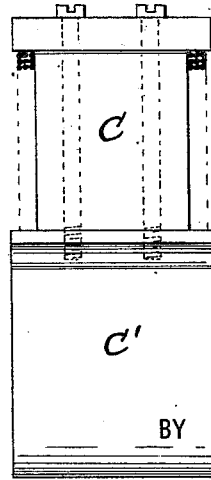
Fig. 4.
Fig. 5.
WITNESSES:
W. H. Graham,
Geo. S. Seward.
INVENTOR
John T. Harris
BY
Geo. H. Graham
ATTORNEY

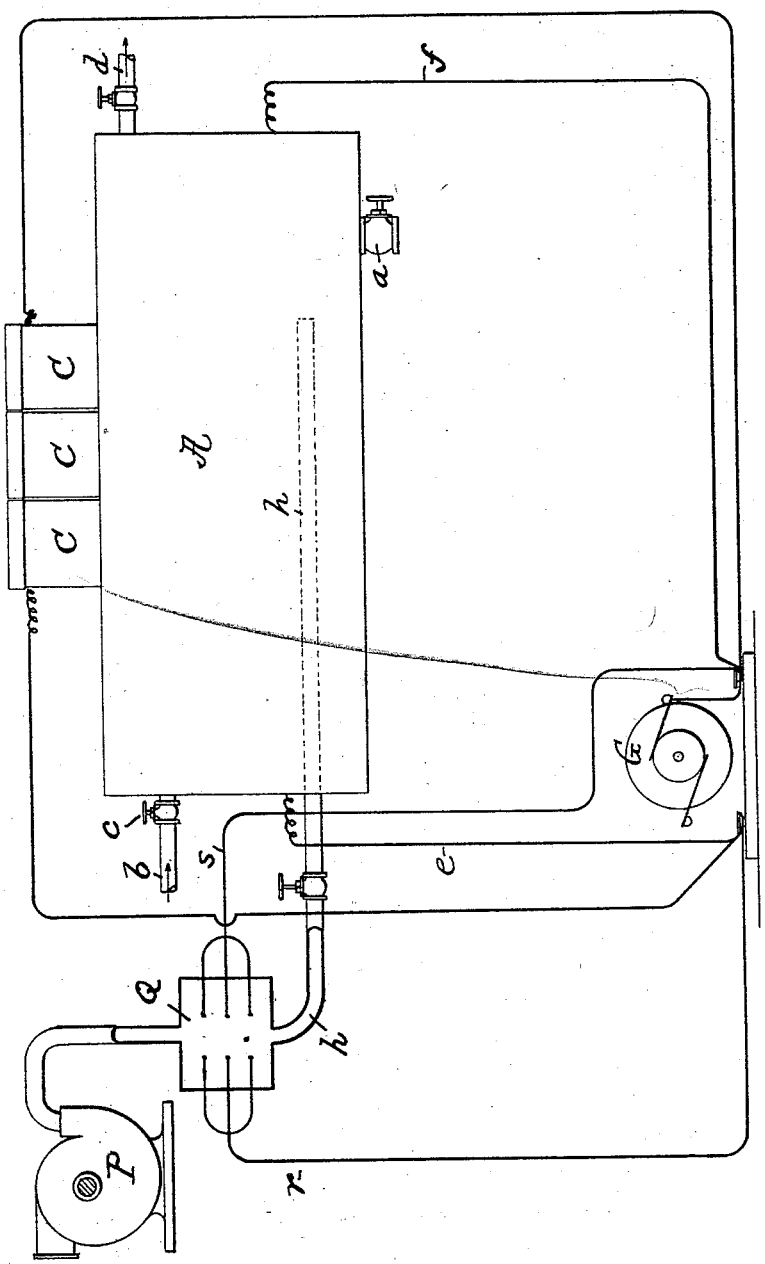

UNITED STATES PATENT OFFICE.

JOHN T. HARRIS, OF NEW YORK, N. Y.

APPARATUS FOR PURIFYING LIQUIDS.

SPECIFICATION forming part of Letters Patent No. 531,118, dated December 18, 1894.

Application filed November 18, 1892. Serial No. 452,366. (No model.)

*To all whom it may concern:*

Be it known that I, JOHN T. HARRIS, a citizen of the United States of America, residing at the city, county, and State of New York, have invented certain new and useful Improvements in Apparatus for Purifying Liquids, of which the following is a specification.

This invention relates particularly to the purification of water and other liquids or fluids, whether the same be under pressure or not. In many impure liquids or fluids the impurities carried thereby are in the form of fine particles, and being so are difficult to remove, especially where there is a strong current in the apparatus; and it is one of the objects of the present invention to provide a simple and effective means by which such impurities are held back, caused to settle or removed.

To this end it consists in the novel apparatus hereinafter set forth and employed either alone or in conjunction with any mechanical, chemical or electrical means of purification or filtration whereby all classes, or certain desired classes, of impurities are removed from the water or other liquid or fluid that passes through the apparatus.

The invention is based upon the well-known principle in natural philosophy that every material body is subject to magnetic influence, and is either paramagnetic or diamagnetic. Paramagnetic substances as are attracted by a magnet, include iron, nickel and cobalt and a few metallic salts and oxides; and a large number of other materials are diamagnetic and are repulsed more or less by a magnet. This latter property of the magnet is utilized in the present invention to repel the diamagnetic particles such as organic matter, albuminoids, silica, alumina, &c., that are held suspended in the liquid, whereby the liquid that is allowed to pass onward is purified, while the remaining body of the liquid acts as a vehicle by which the impurities or other matters may be conveyed away from the purified liquid. The purifying or settling action of the magnet may be employed in conjunction with the action of an electric current that is caused to pass through the liquid that is being acted upon, or which is to be acted upon, by the magnet; and, also, such action of the magnet may be employed in conjunction with the liquid which is being or has been treated by forcing air, oxygen, ozone, or other oxidizing agent therein; or, the magnet may be used when both of such treatments are used. In the practice of this method there is provided one or more permanent or electro-magnets supported in position so that the pole-pieces are either wholly or partially immersed by, or are in the path of the flow of liquid as it passes onward, in such manner that the liquid is subjected to the lines of force of the magnet or magnets either while it is at rest or in its onward flow and whether its flow be regular or intermittent.

The particular location of the magnet pole pieces and their construction or form may be greatly varied, depending upon the class of apparatus with which the magnet or magnets may be used, and also upon the character or nature of the liquid or fluid being treated, it being simply necessary that the liquid or fluid, either as a stream or as a body, shall pass or flow or be confined within the influence of the magnetic lines of force, whereby the impurities or other matters carried by such liquid or fluid may be properly and effectually prevented from passing onward or caused to settle or be otherwise removed.

In the practical application of the invention it is obvious that the style of apparatus may be varied within wide limits, but there is shown in the accompanying drawings an apparatus of special construction adapted to a special arrangement of the magnets, such being the preferred form so far as present experience has demonstrated.

In said drawings: Figure 1, is a longitudinal sectional elevation of an apparatus embodying the invention and adapted to the carrying out of the improved method. Fig. 2, is a plan view of the same. Fig. 3, is a cross section, taken on the line 3, 3, of Fig. 1. Figs. 4 and 5 are enlarged elevation and cross section of a magnet core and its pole pieces. Fig. 6, is a diagram hereinafter described.

As the improved method of purifying or otherwise treating liquids or fluids will be better understood by describing an apparatus designed to carry out such method, a description of such apparatus will first be given.

The apparatus taken for illustration consists of a casing A forming a holder or receptacle for the liquid being treated, and is shown arranged longitudinally with a sufficient depth to provide a settling or collecting basin B for the repelled impurities or other matters that may be caused to settle, and of a width preferably suited to the form of magnet pole pieces that may be employed. The settling basin has a draw-off valve $a$, through which the collected substances may be removed from the holder. At one end of the casing, preferably near its upper end, it is connected with an induction pipe $b$, controlled by a valve $c$, and through which pipe the liquid to be treated may pass into the holder. The casing is also provided with an eduction pipe $d$, by which the purified liquid is allowed to pass from the holder. The holder may be entirely closed, depending upon whether the liquid is under pressure or not. At the upper side of the holder, preferably some distance from the induction pipe, there is supported one or more magnets C—electro magnets are shown—the pole-pieces $C'$ of which extend sufficiently into the holder so as to be immersed to a more or less degree by the liquid therein. The pole pieces of the magnet or magnets are of iron of considerable depth and width, and some thickness, and are supported so that the opposite pole-pieces of each magnet provide a narrow space $C^2$ between their adjacent or opposed faces. At the point where the lines of force are the greatest or the most powerful, the orifice of the eduction pipe $d$, is located, and as this point occurs at or near the upper end of the pole pieces near the point where they join the magnet cores, the liquid is compelled to pass upward through a space in which the lines of force gradually become stronger and stronger and finally enter the eduction pipe or leave the holder at the point of their strongest influence. It is obvious that the eduction pipe may be led from this point in any direction it may be desired to lead it. In this passage of the liquid between the pole pieces, the diamagnetic substances which it may contain are repelled with a gradually increasing force, and as there is a body of liquid constantly present, these repelled substances or particles descend through such body of liquid and are caused, more or less quickly, to settle at the bottom of the holder. Where a number of magnets are employed, their pole pieces will extend in a longitudinal direction, and separated from the pole pieces of the adjacent magnet or magnets by a small space, so that the number of pole pieces provide a narrow vertical and longitudinally extending channel for the liquid passing between the opposite pole pieces.

Instead of leading a separate eduction pipe from the space between each magnet, there may be provided a continuous conduit extending longitudinally the length of the several pole pieces, which conduit is open on its under side and finally emerges into an unbroken eduction pipe that is adapted to convey the purified liquid led into it out of the holder.

The holder is preferably formed of some diamagnetic material, such as wood, so that the lines of magnetic force are not diverted, and also so that the deposited or settling particles may not be repulsed or retarded from settling.

Instead of depending wholly upon the magnetic treatment of the liquid as thus far described, such treatment may be used in connection with a current of electricity that may pass through the liquid in the holder, or which has been caused to pass through such liquid before or as it is being conducted to the holder. For this purpose a conductor $e$, leading from any suitable source of electricity, is led to or into the liquid in the holder, and another conductor $f$, is also led into the holder; the terminals of each of these conductors being arranged so that the current from any suitable generator G, Fig. 6, will pass through the body of liquid in the holder. The current that may pass through the liquid may be such as to have an electrolytic action, and, therefore, strong enough to make the decomposition of the liquid more or less visible, or the current may be such as to have little decomposing effect, but rather an electrifying action.

In passing an electric current through the body of liquid within the influence of the magnetic lines of force, their repelling property is augmented and the impurities carried by the liquid more effectually removed. In addition to this use of electric current, or independent thereof, the body of liquid being treated or on its way to be treated by the magnets as before described, may have forced into it air, oxygen, ozone, or other oxidizing or aerating agent to further aid the purification of the liquid. I prefer, however, to use, as being less expensive, ozonized air, as being more effective than ordinary air, and which may be produced in a simple manner by causing electrical discharges to pass through the air in a confined space as it is being conducted to the holder. The pipe $h$, conveying this ozonized air or other oxidizing agent is shown as leading into the holder, and provided with a number of perforations, which permit the agent to be forced into the body of liquid in the holder to aerate it or to cause the more ready oxidation of the impurities therein.

One mode or ozonizing the air passing to the casing A, is indicated in Fig. 6, where the air conduit leading from an air force pump P is enlarged into a chamber Q, into which are led one or more terminals of a pair of conductors $r$, $s$, leading from the generator G. The electrical discharges passing between the terminals within and across the air chamber Q ozonize the air as it is forced and conducted onward to enter the liquid in the casing A.

While I have only shown one holder for the liquid it is obvious that two or more may be employed, into the second one of which the liquid carried off by the eduction pipe $p$, from the first holder, may be conveyed, and such liquid be again subjected to the influence of the lines of magnetic force of another magnet or a number of magnets, to be then conveyed in a similar manner from such second holder by an eduction pipe for use or for further treatment.

The induction pipe for leading the liquid into the holder is preferably arranged so that the inflowing current will not unnecessarily disturb the proper settling of the repelled substances and this tendency may be effectually guarded against by arranging one or more diaphragms $i$, one extending downward within a short distance of the bottom of the holder and the other one extending upward within a short distance from the upper level or top of the holder, and separating the incoming supply of liquid from the body in which the settling action is taking place. Substantially the same effect may be produced by extending the end of the induction pipe some distance into the holder as indicated by dotted lines in Fig. 1, and perforating such extension for the liquid to flow from the pipe in a number of small streams.

From the foregoing it will be understood that the improved method consists substantially in causing the holding back, settling or depositing of diamagnetic substances held in suspension in a liquid by subjecting such liquid to magnetic action so that the liquid from which the diamagnetic substances have been expelled may pass onward free from such substances, while the liquid yet under treatment acts as a vehicle for such repelled substances to convey them away in their repelled or settling movement.

What is claimed is—

1. The herein described apparatus for purifying liquids, consisting of a receptacle for the liquid, an induction passage opening thereinto, a magnet having its pole piece extending into the said receptacle, and an eduction pipe having its exit orifice located in close proximity to the surface of the pole piece, substantially as specified.

2. The herein described apparatus for purifying liquids, consisting of a receptacle for the liquid, an induction passage opening thereinto, a double pole magnet having its pole pieces extending into the said receptacle, and an eduction pipe having its exit orifice located in close proximity to the surface of the pole pieces, substantially as specified.

3. The herein described liquid purifying apparatus, consisting of a holder for the liquid, an induction pipe leading thereto, a magnet having its pole pieces extending into said holder, an eduction pipe the orifice of which leads from between said pole pieces, electrodes within the holder to increase the effect of the magnet, and a pipe for conducting an oxidizing agent into said holder.

4. The combination of the holder having a supply or induction pipe leading thereto, a magnet having its pole pieces extending into the liquid space in said holder and an eduction pipe, the orifice of which leads from between said pole pieces, substantially as described.

5. The combination of the holder for the liquid, a magnet having for its pole pieces two opposed broad pieces of metal providing a vertical space between the pole pieces which extend into the liquid space in the holder, an eduction pipe leading from the upper end of the space between the pole pieces and means for supplying liquid to the holder, substantially as described.

6. The combination of the holder for the liquid, a plurality of magnets having their pole pieces extending into the liquid space in said holder, and an eduction pipe, the orifice of which leads from between each of the pairs of pole-pieces of the magnets, substantially as described.

In witness whereof I have hereunto set my hand in the presence of two subscribing witnesses.

JOHN T. HARRIS.

Witnesses:
GEO. H. GRAHAM,
E. L. TODD.